United States Patent
Shan et al.

(10) Patent No.: US 10,209,944 B2
(45) Date of Patent: Feb. 19, 2019

(54) INTERFACE SHARING METHOD AND TERMINAL DEVICE

(71) Applicant: Huawei Technologies Co., Ltd., Shenzhen (CN)

(72) Inventors: Zhenwei Shan, Shenzhen (CN); Cunzhi Fan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/520,030

(22) PCT Filed: Nov. 25, 2014

(86) PCT No.: PCT/CN2014/092192
§ 371 (c)(1),
(2) Date: Apr. 18, 2017

(87) PCT Pub. No.: WO2016/082107
PCT Pub. Date: Jun. 2, 2016

(65) Prior Publication Data
US 2017/0351478 A1    Dec. 7, 2017

(51) Int. Cl.
*G06F 3/14* (2006.01)
*G06F 3/0481* (2013.01)
(Continued)

(52) U.S. Cl.
CPC ............ *G06F 3/1454* (2013.01); *G06F 9/452* (2018.02); *G06F 21/6245* (2013.01);
(Continued)

(58) Field of Classification Search
CPC ..... G06F 3/1454; G06F 3/04817; G09G 5/12; G09G 2370/04; H04L 63/102
(Continued)

(56) References Cited

U.S. PATENT DOCUMENTS 5,566,192 A * 10/1996 Moon .................. H03M 7/425
341/67
6,282,583 B1 * 8/2001 Pincus .............. G06F 15/17337
712/13
(Continued)

FOREIGN PATENT DOCUMENTS

CN     101447998 A    6/2009
CN     103092510 A    5/2013
(Continued)

OTHER PUBLICATIONS

"Series H: Audiovisual and Multimedia Systems; Infrastructure of audiovisual services—Coding of moving video; Advanced video coding for generic audiovisual services," Telecommunications Standardization Sector of ITU, Feb. 2014, 790 pages, ITU-T H.264, International Telecommunication Union.
(Continued)

*Primary Examiner* — Prabodh M Dharia
(74) *Attorney, Agent, or Firm* — Slater Matsil, LLP

(57) ABSTRACT

A first terminal device shares a first interface with a second terminal device. If the first terminal device obtains a notification message to trigger generation of a second interface, the first terminal device first determines whether the second interface belongs to a preset sharing-forbidden interface. If the second interface belongs to the preset sharing-forbidden interface, the first terminal device shares only the first interface with the second terminal device, or suspends interface sharing with the second terminal device.

20 Claims, 9 Drawing Sheets

(51) Int. Cl.
*G06F 9/451* (2018.01)
*G09G 5/12* (2006.01)
*G06F 21/62* (2013.01)
*H04L 29/06* (2006.01)
*H04W 68/02* (2009.01)
*G06F 21/84* (2013.01)

(52) U.S. Cl.
CPC ............ *G06F 21/84* (2013.01); *G09G 5/12* (2013.01); *H04L 63/101* (2013.01); *H04L 63/102* (2013.01); *H04W 68/02* (2013.01); *G06F 3/04817* (2013.01); *G09G 2358/00* (2013.01); *G09G 2370/04* (2013.01)

(58) Field of Classification Search
USPC .................... 345/2; 709/204, 228; 725/58
See application file for complete search history.

(56) References Cited

U.S. PATENT DOCUMENTS

| | | | | |
|---|---|---|---|---|
| 6,681,310 | B1* | 1/2004 | Kusters | G06F 3/0626 707/999.102 |
| 9,560,366 | B2* | 1/2017 | Neuman | H04N 19/40 |
| 9,626,530 | B2* | 4/2017 | Xiao | G06F 21/629 |
| 2004/0243672 | A1* | 12/2004 | Markki | H04L 29/06 709/204 |
| 2005/0008331 | A1* | 1/2005 | Nishimura | H04N 5/783 386/344 |
| 2005/0240691 | A1* | 10/2005 | Yurusov | G06F 13/4027 710/62 |
| 2006/0104637 | A1* | 5/2006 | Huffman | H04B 10/2503 398/66 |
| 2006/0143370 | A1* | 6/2006 | Matsushita | G11C 16/10 711/103 |
| 2007/0130585 | A1* | 6/2007 | Perret | H04N 7/17318 725/46 |
| 2008/0091312 | A1* | 4/2008 | Katzer | A63H 19/24 701/19 |
| 2008/0115170 | A1* | 5/2008 | Ray | H04H 40/09 725/58 |
| 2009/0094369 | A1* | 4/2009 | Wooldridge | H04L 29/06027 709/228 |
| 2011/0106956 | A1* | 5/2011 | Luo | H04L 29/06 709/228 |
| 2013/0024571 | A1* | 1/2013 | Wu | H04L 12/2821 709/225 |
| 2015/0067543 | A1* | 3/2015 | Mo | H04W 4/21 715/756 |
| 2015/0124658 | A1* | 5/2015 | Anson | H04W 72/04 370/259 |
| 2015/0186095 | A1 | 7/2015 | Dong et al. | |
| 2015/0356309 | A1 | 12/2015 | Xiao | |
| 2017/0372057 | A1* | 12/2017 | Coburn | G06F 21/36 |

FOREIGN PATENT DOCUMENTS

| | | |
|---|---|---|
| CN | 103701927 A | 4/2014 |
| EP | 2469442 A1 | 6/2012 |
| JP | 2011060000 A | 3/2011 |

OTHER PUBLICATIONS

"Series H: Audiovisual and Multimedia Systemsi; Infrastructure of audiovisual services—Coding of moving video; High efficiency video coding," Telecommunication Standardization Sector of ITU, Oct. 2014, 540 pages, ITU-T H.265, International Telecommunication Union.

* cited by examiner

INTERFACE SHARING METHOD AND TERMINAL DEVICE

CROSS-REFERENCE TO RELATED APPLICATIONS

This application is a continuation of International Patent Application No. PCT/CN2014/092192, filed on Nov. 25, 2014, the disclosure of which is hereby incorporated by reference in its entirety.

TECHNICAL FIELD

The present invention relates to the field of communications technologies, and in particular, to an interface sharing method and a terminal device.

BACKGROUND

With popularization of 3G (3rd Generation, third generation) communications technologies and rapid development of intelligent terminals, a traditional consumer electronics market changes tremendously, which greatly affects and changes people's lifestyles. Currently, configuration of the intelligent terminals is being continually enhanced, and applications based on the intelligent terminals are also becoming more diverse. There are multiple applications in an interface of an intelligent terminal, so that interface sharing between different intelligent terminals is particularly important.

As shown in FIG. 1A, FIG. 1B, and FIG. 1C, a main interface of a terminal A is shared with a terminal B, and the main interface of the terminal A is also presented on the terminal B. In this case, the terminal A is referred to as a first terminal device, and the terminal B is referred to as a second terminal device.

However, in a current interface sharing solution, if in a process of sharing an interface between the terminal devices, the first terminal device suddenly receives a call, an SMS message, a QQ message, or the like, a caller ID display interface, an SMS message interface, or a QQ message interface in the first terminal device is also shared with the second terminal device. As shown in FIG. 1D, a terminal A and a terminal B share an interface 1: a game interface. If the terminal A suddenly receives a call message in this process, the terminal A displays an interface 2: a call display interface. In this case, the terminal A shares the interface 2 with the terminal B, and an interface shared between the terminal A and the terminal B transforms from an interface shown in FIG. 1D to that shown in FIG. 1E.

However, a user who holds the first terminal device may not want to share information that involves privacy with the second terminal device. Therefore, the current interface sharing solution has disadvantages of relatively low security and relatively poor flexibility.

SUMMARY

Embodiments of the present invention provide an interface sharing method and a terminal device, to resolve disadvantages of relatively low security and relatively poor flexibility that exist in a current interface sharing solution.

According to a first aspect, an interface sharing method is provided. The method includes sharing a first interface with a second terminal device. The method also includes obtaining a notification message to trigger generation of a second interface. The method also includes determining, by a first terminal device, whether the second interface corresponding to the notification message belongs to a preset sharing-forbidden interface. The method also includes, when determining that the second interface belongs to the preset sharing-forbidden interface, sharing, by the first terminal device, only the first interface with the second terminal device, or suspending interface sharing with the second terminal device.

With reference to the first aspect, in a first possible implementation manner, the method further includes: when determining that the second interface does not belong to the preset sharing-forbidden interface, sharing, by the first terminal device, the generated second interface with the second terminal device.

With reference to the first aspect and the first possible implementation manner of the first aspect, in a second possible implementation manner, the determining, by the first terminal device, that the second interface belongs to the preset sharing-forbidden interface specifically includes: obtaining, by the first terminal device, an application identifier of an application corresponding to the notification message; and when the first terminal device determines that the application identifier belongs to a preset application identifier, determining, by the first terminal device, that the second interface belongs to the preset sharing-forbidden interface.

With reference to the first aspect and the first possible implementation manner of the first aspect, in a second possible implementation manner, the determining, by the first terminal device, that the second interface belongs to the preset sharing-forbidden interface specifically includes: obtaining, by the first terminal device, an application identifier of an application corresponding to the notification message; and when the first terminal device determines that the application identifier belongs to a preset application identifier, determining, by the first terminal device, that the second interface belongs to the preset sharing-forbidden interface.

With reference to the first aspect and the first to the third possible implementation manners of the first aspect, in a fourth possible implementation manner, after the suspending, by the first terminal device, interface sharing with the second terminal device, the method further includes: sending, by the first terminal device, a decoding stop notification message to the second terminal device to instruct the second terminal device to stop decoding the first interface.

With reference to the first aspect and the first to the fourth possible implementation manners of the first aspect, in a fifth possible implementation manner, after the suspending, by the first terminal device, interface sharing with the second terminal device, the method further includes: sending, by the first terminal device, an interface presentation notification message to the second terminal device, where the interface presentation notification message is used to instruct the second terminal device to present an interface corresponding to the last frame of data that is related to the first interface and that is sent by the first terminal device and received by the second terminal device.

With reference to the first aspect and the first to the fifth possible implementation manners of the first aspect, in a sixth possible implementation manner, the second interface covers the first interface, or the second interface and the first interface are displayed together on a display screen.

With reference to the first aspect, in a seventh possible implementation manner, if the first interface includes at least one application icon, after the first terminal device shares the first interface with the second terminal device, the method further includes: receiving, by the first terminal device, a first operation request sent by the second terminal device, where the first operation request is used to trigger generation of a third interface; determining, by the first terminal device, the to-be-operated application according to the first operation request; and after determining that the to-be-operated application meets a first preset condition, forbidding, by the first terminal device, sharing of the third interface with the second terminal device.

With reference to the seventh possible implementation manner of the first aspect, in an eighth possible implementation manner, the first operation request carries location information of the to-be-operated application in the second terminal device; and the determining, by the first terminal device, the to-be-operated application according to the first operation request specifically includes: determining, by the first terminal device, the to-be-operated application according to the location information.

With reference to the seventh or the eighth possible implementation manner of the first aspect, in a ninth possible implementation manner, the determining, by the first terminal device, that the to-be-operated application meets a first preset condition specifically includes: obtaining, by the first terminal device, an interface identifier of the third interface, and determining that the interface identifier belongs to a preset interface identifier; or obtaining, by the first terminal device, an application identifier of the to-be-operated application, and determining that the application identifier belongs to a preset application identifier.

With reference to the seventh or the eighth possible implementation manner of the first aspect, in a tenth possible implementation manner, the method further includes: after determining that the to-be-operated application does not meet the first preset condition, generating, by the first terminal device according to the first operation request, the third interface used to represent the to-be-operated application; and sharing, by the first terminal device, the third interface with the second terminal device.

With reference to the tenth possible implementation manner of the first aspect, in an eleventh possible implementation manner, after the determining, by the first terminal device, that the to-be-operated application does not meet the first preset condition, and before the sharing the third interface with the second terminal device, the method further includes: determining, by the first terminal device, that a quantity of times of receiving the first operation request sent by the second terminal device does not reach a preset threshold.

With reference to the tenth or the eleventh possible implementation manner of the first aspect, in a twelfth possible implementation manner, after the sharing, by the first terminal device, the third interface with the second terminal device, the method further includes: receiving, by the first terminal device, a second operation request sent by the second terminal device, where the second operation request is used to trigger generation of a fourth interface; and when obtaining an interface identifier of the fourth interface, and determining that the interface identifier belongs to the preset interface identifier, forbidding, by the first terminal device, sharing of the fourth interface with the second terminal device.

According to a second aspect, a first terminal device is provided. The first terminal device includes an obtaining unit, configured to: in a process of sharing a first interface with a second terminal device, obtain a notification message used to trigger generation of a second interface. The first terminal device also includes a determining unit, configured to determine whether the second interface corresponding to the notification message belongs to a preset sharing-forbidden interface. The first terminal device also includes a sharing unit, configured to: when the determining unit determines that the second interface belongs to the preset sharing-forbidden interface, share only the first interface with the second terminal device, or suspend interface sharing with the second terminal device.

With reference to the second aspect, in a first possible implementation manner, the sharing unit is further configured to: when the determining unit determines that the second interface does not belong to the preset sharing-forbidden interface, share the generated second interface with the second terminal device.

With reference to the second aspect and the first possible implementation manner of the second aspect, in a second possible implementation manner, the determining unit is specifically configured to: obtain an application identifier of an application corresponding to the notification message; and when determining that the application identifier belongs to a preset application identifier, determine that the second interface belongs to the preset sharing-forbidden interface.

With reference to the second aspect and the first possible implementation manner of the second aspect, in a third possible implementation manner, the determining unit is specifically configured to: obtain an interface identifier of the second interface; and when determining that the interface identifier belongs to a preset interface identifier, determine that the second interface belongs to the preset sharing-forbidden interface.

With reference to the second aspect and the first to the third possible implementation manners of the second aspect, in a fourth possible implementation manner, the first terminal device further includes a first sending unit, where the first sending unit is configured to: send a decoding stop notification message to the second terminal device to instruct the second terminal device to stop decoding the first interface.

With reference to the second aspect and the first to the fourth possible implementation manners of the second aspect, in a fifth possible implementation manner, the first terminal device further includes a second sending unit, where the second sending unit is configured to: send an interface presentation notification message to the second terminal device, where the interface presentation notification message is used to instruct the second terminal device to present an interface corresponding to the last frame of data that is related to the first interface and that is sent by the first terminal device and received by the second terminal device.

With reference to the second aspect and the first to the fifth possible implementation manners of the second aspect, in a sixth possible implementation manner, the second interface covers the first interface, or the second interface and the first interface are displayed together on a display screen.

With reference to the second aspect, in a seventh possible implementation manner, if the first interface includes at least one application icon, the first terminal device further includes a receiving unit, where the receiving unit is configured to: receive a first operation request sent by the second terminal device, where the first operation request is used to trigger generation of a third interface; determine the to-be-operated application according to the first operation request; and after determining that the to-be-operated application meets a first preset condition, forbid sharing of the third interface with the second terminal device.

With reference to the seventh possible implementation manner of the second aspect, in an eighth possible implementation manner, the first operation request carries location information of the to-be-operated application in the second terminal device; and that the receiving unit determines the to-be-operated application according to the first operation request is specifically: determining the to-be-operated application according to the location information.

With reference to the seventh or the eighth possible implementation manner of the second aspect, in a ninth possible implementation manner, that the receiving unit determines that the to-be-operated application meets a first preset condition is specifically: obtaining an interface identifier of the third interface, and determining that the interface identifier belongs to a preset interface identifier; or obtaining an application identifier of the to-be-operated application, and determining that the application identifier belongs to a preset application identifier.

With reference to the seventh or the eighth possible implementation manner of the second aspect, in a tenth possible implementation manner, the sharing unit is further configured to: after the determining unit determines that the to-be-operated application does not meet the first preset condition, generate, according to the first operation request, the third interface used to represent the to-be-operated application; and share the third interface with the second terminal device.

With reference to the tenth possible implementation manner of the second aspect, in an eleventh possible implementation manner, the sharing unit is further configured to: determine that a quantity of times of receiving the first operation request sent by the second terminal device does not reach a preset threshold.

With reference to the tenth or the eleventh possible implementation manner of the second aspect, in a twelfth possible implementation manner, the receiving unit is further configured to: receive a second operation request sent by the second terminal device, where the second operation request is used to trigger generation of a fourth interface; and when obtaining an interface identifier of the fourth interface, and determining that the interface identifier belongs to a preset interface identifier, forbid sharing of the fourth interface with the second terminal device.

According to a third aspect, a first terminal device is provided, including at least one processor, a communications bus, a memory, at least one communications interface, and a receiver. The communications bus is configured to implement connection and communication between the foregoing components. The communications interface is configured to connect to and communicate with an external device. The memory is configured to store executable program code. The receiver is configured to: in a process of sharing a first interface with a second terminal device, obtain a notification message used to trigger generation of a second interface. The processor executes the program code stored in the memory to: determine whether the second interface corresponding to the notification message belongs to a preset sharing-forbidden interface; and when determining that the second interface belongs to the preset sharing-forbidden interface, share only the first interface with the second terminal device, or suspend interface sharing with the second terminal device.

In the prior art, in a process in which a first terminal device shares a first interface with a second terminal device, if the first terminal device receives a notification message such as a call message or an SMS message, regardless of whether the notification message belongs to privacy, the first terminal device shares a generated second interface with the second terminal device. Therefore, security and flexibility are relatively low. However, in the embodiments of the present invention, in a process in which a first terminal device shares a first interface with a second terminal device, when obtaining a notification message used to trigger generation of a second interface, a first terminal device first needs to determine whether the second interface corresponding to the notification message belongs to a preset sharing-forbidden interface. If the second interface belongs to the preset sharing-forbidden interface, the first terminal device shares only the first interface with the second terminal device, or suspends interface sharing with the second terminal device. Therefore, security and flexibility are improved.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the following, preferred implementation manners of the present invention are described in detail with reference to the accompanying drawings. It should be understood that the preferred embodiments described herein are only used to illustrate and explain the present invention, but are not intended to limit the present invention. In addition, the embodiments of the present application and features in the embodiments may be mutually combined in a case of no conflict.

The following describes in detail the preferred implementation manners of the present invention with reference to the accompanying drawings.

Figure 1A:
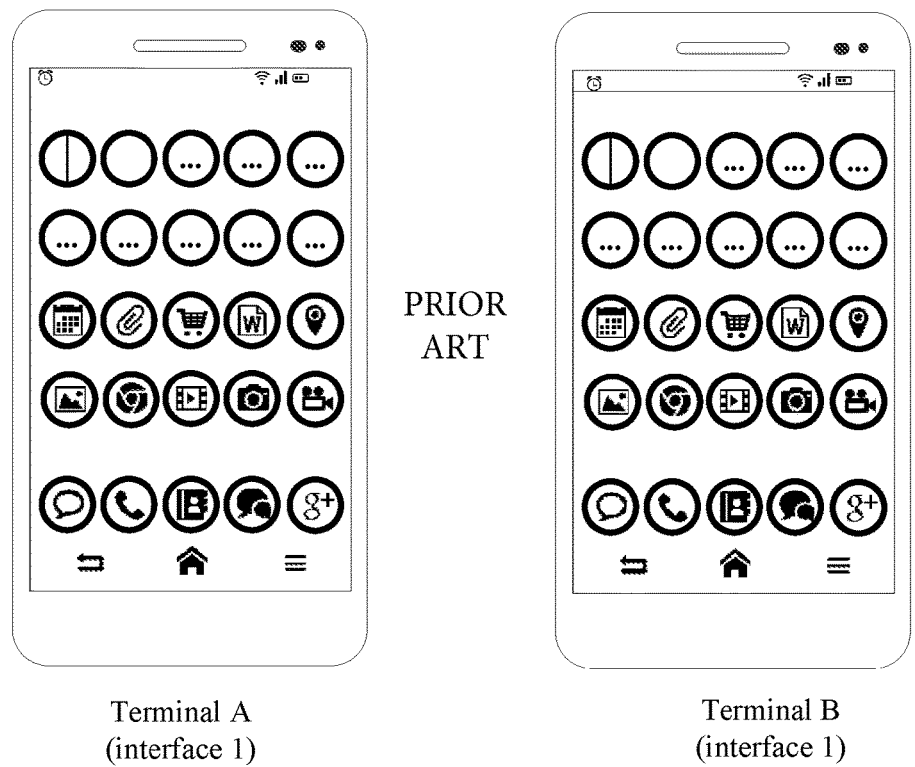
FIG. 1A is a schematic diagram of interface sharing in the prior art.
Figure 1B:
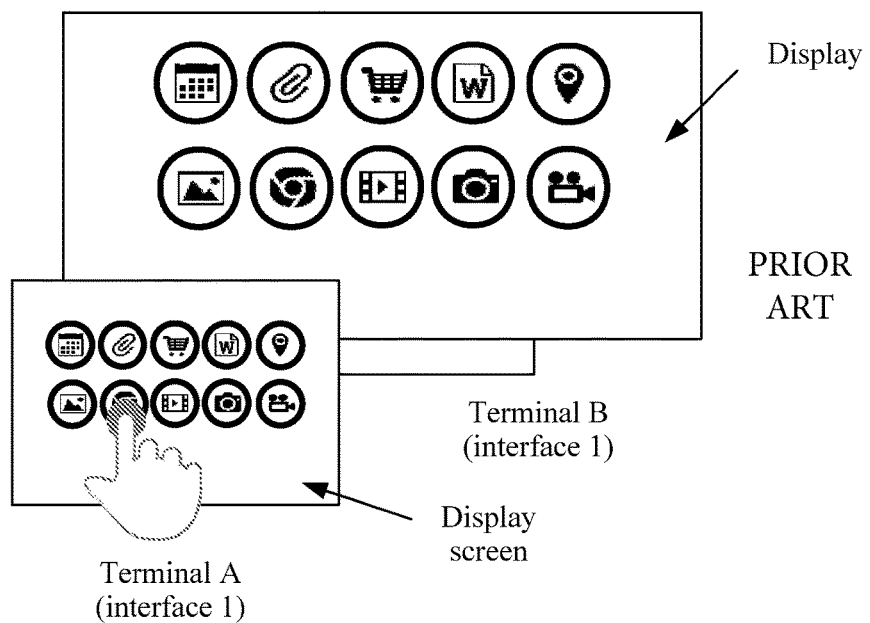
FIG. 1B is another schematic diagram of interface sharing in the prior art.
Figure 1C:
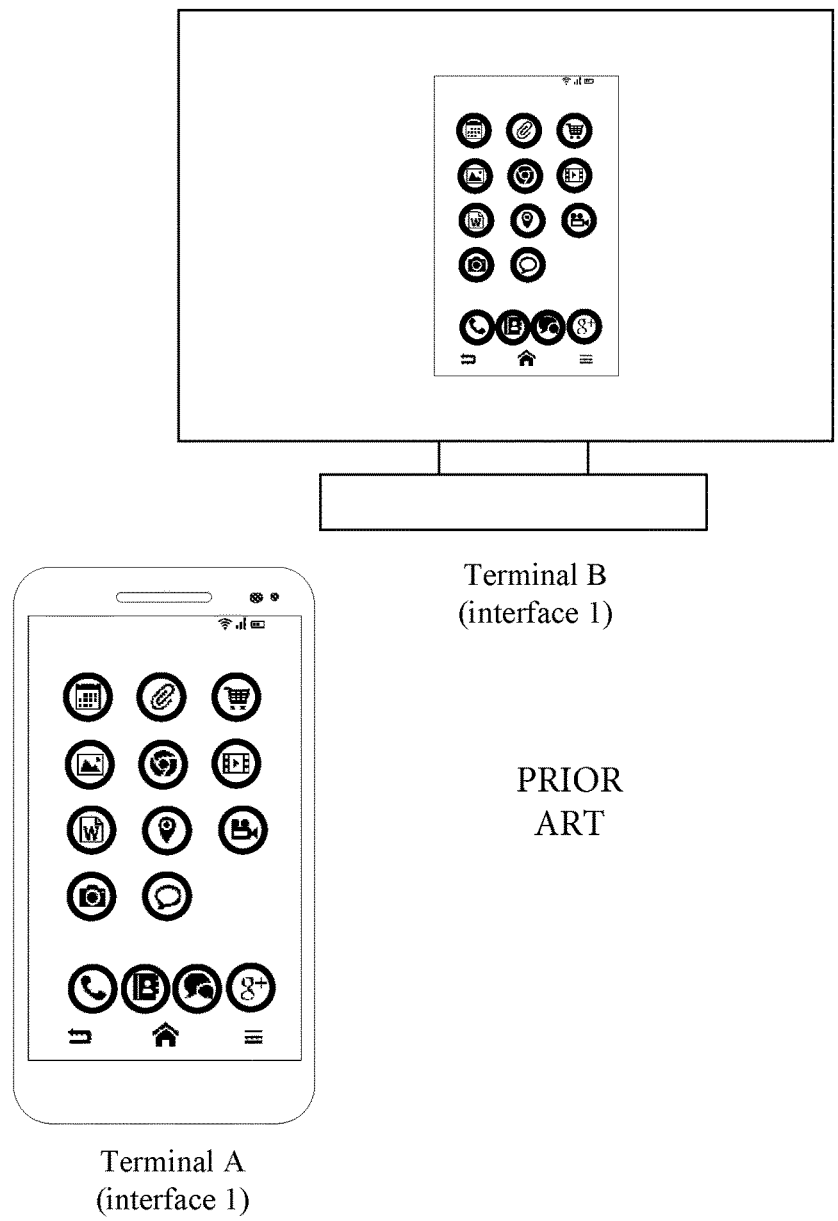
FIG. 1C is another schematic diagram of interface sharing in the prior art.
Figure 1D:
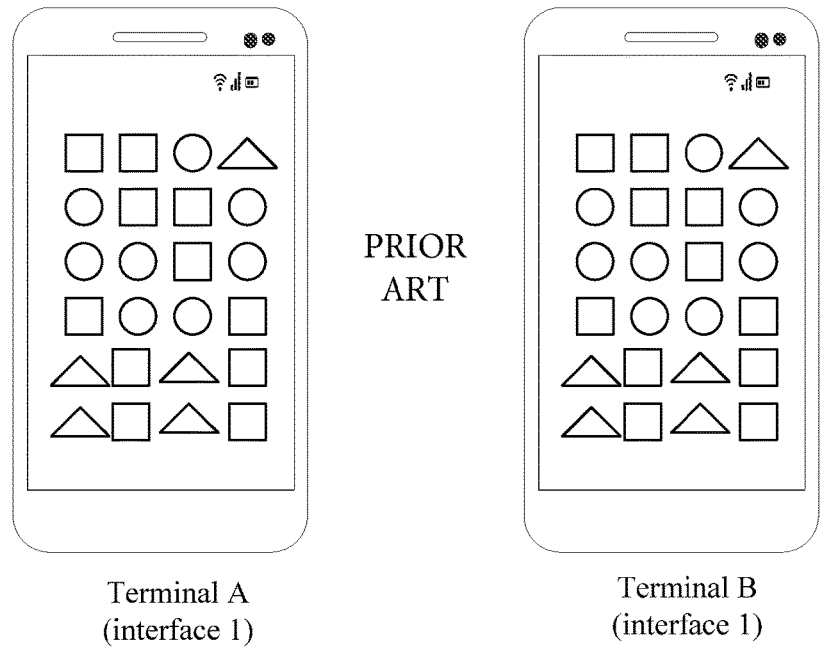
FIG. 1D is another schematic diagram of interface sharing in the prior art.
Figure 1E:
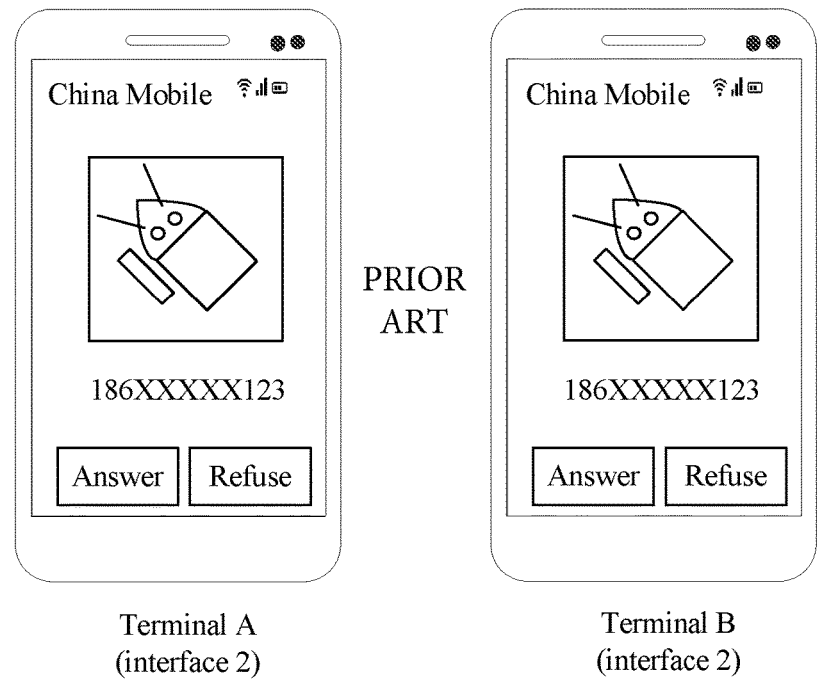
FIG. 1E is another schematic diagram of interface sharing in the prior art.
Figure 2A:
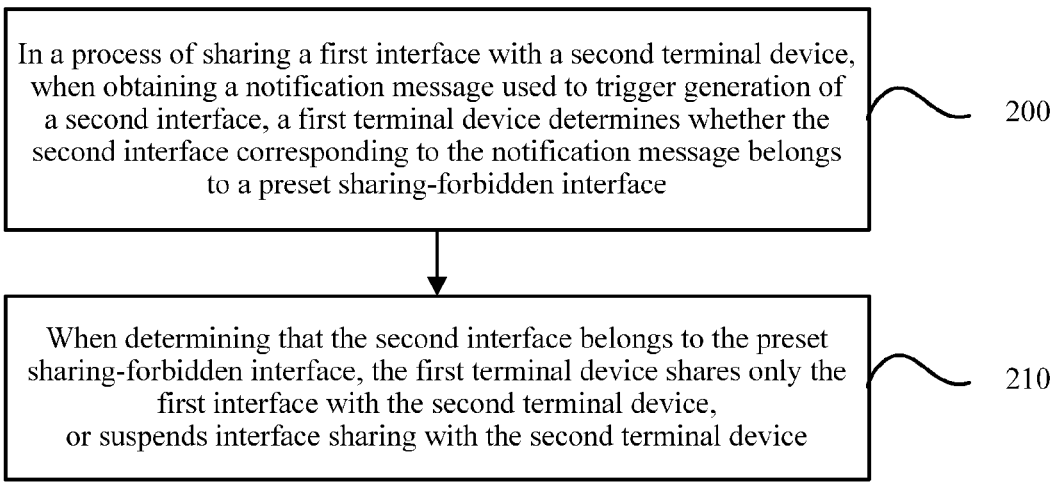
FIG. 2A is a flowchart of interface sharing according to an embodiment of the present invention.

Referring to FIG. 2A, in an embodiment of the present invention, an interface sharing process is as follows.

Step 200. In a process of sharing a first interface with a second terminal device, when obtaining a notification message used to trigger generation of a second interface, a first terminal device determines whether the second interface corresponding to the notification message belongs to a preset sharing-forbidden interface.

Step 210. When determining that the second interface belongs to the preset sharing-forbidden interface, the first terminal device shares only the first interface with the second terminal device, or suspends interface sharing with the second terminal device.

In this embodiment of the present invention, before performing step 210, the first terminal device needs to store information about the preset sharing-forbidden interface.

In this embodiment of the present invention, a precondition for sharing, by the first terminal device, the first interface with the second terminal device is that both the first terminal device and the second terminal device need to start an application or a service that is used to implement sharing. In addition, the first terminal device and the second terminal device may implement interface sharing between the two terminal devices in any one of a WiFi (wireless fidelity) manner, a Bluetooth manner, a Wi-Fi Direct manner, or a TDLS (Tunneled Direct Link Setup) manner. Certainly, sharing may be implemented in other manners, and details are not described one by one herein.

In this embodiment of the present invention, before the first terminal device shares the first interface with the second terminal device, the two terminal devices need to negotiate a capability, for example, whether the second terminal device supports H.264 decoding, or whether a UIBC (User Input Back Channel) is supported between the first terminal device and the second terminal.

The first terminal device shares the first interface with the second terminal device in the following implementation manner.

Step 1. The first terminal device requests the second terminal device to initiate setup of an RTSP (Real Time Streaming Protocol) session.

Step 2. The second terminal device initiates an RTSP session setup message, where the message carries a parameter wfd-presentation-url.

Step 3. The first terminal device replies with an RTSP session setup response message.

Step 4. The second terminal device requests to play data in the shared interface.

Step 5. The first terminal device replies to the request, and transmits a media stream that is related to the first interface and that is encoded by using a compression coding scheme such as H.264/H.265.

Sharing of the first interface between the first terminal device and the second terminal device may be implemented by using step 1 to step 5.

In this embodiment of the present invention, the notification message obtained by the first terminal device may be initiated by the first terminal device, such as an event-notified notification message or a time-notified notification message; certainly, may be sent by another terminal device, such as a call message or an instant message that is sent by the second terminal device; or may be obtained in another manner, and details are not described one by one herein.

The foregoing describes an operation performed when a determining result obtained by the first terminal device is that the second interface belongs to the preset sharing-forbidden interface. Certainly, in actual application, the determining result obtained by the first terminal device may be that the second interface does not belong to the preset sharing-forbidden interface. In this case, the first terminal device needs to perform the following operation: sharing the generated second interface with the second terminal device.

That is, the first terminal device shares the generated second interface with the second terminal device when determining that the second interface does not belong to the preset sharing-forbidden interface.

In this embodiment of the present invention, there are multiple manners for determining, by the first terminal device, that the second interface belongs to the preset sharing-forbidden interface. For example, the following manner may be used: obtaining, by the first terminal device, an application identifier of an application corresponding to the notification message; and when the first terminal device determines that the application identifier belongs to a preset application identifier, determining, by the first terminal device, that the second interface belongs to the preset sharing-forbidden interface.

Likewise, when determining that the second interface does not belong to the preset sharing-forbidden interface, the first terminal device may alternatively use the foregoing manner: obtaining, by the first terminal device, an application identifier of an application corresponding to the notification message; and when the first terminal device determines that the application identifier does not belong to a preset application identifier, determining, by the first terminal device, that the second interface does not belong to the preset sharing-forbidden interface.

The foregoing describes that the first terminal device determines, according to the application identifier of the application corresponding to the notification message, whether the second interface belongs to the preset sharing-forbidden interface.

For example, if the application corresponding to the notification message is a call application, an application identifier corresponding to the call application is obtained, and it is checked whether the application identifier corresponding to the call application belongs to the preset application identifier. If the application corresponding to the notification message is an SMS message application, an application identifier corresponding to the SMS message application is obtained, and it is checked whether the application identifier corresponding to the SMS message application belongs to the preset application identifier.

Certainly, in actual application, second interfaces corresponding to different applications may have different interface identifiers. Therefore, in this embodiment of the present invention, the following manner may alternatively be used to determine that the second interface belongs to the preset sharing-forbidden interface: obtaining, by the first terminal device, an interface identifier of the second interface; and when the first terminal device determines that the interface identifier belongs to a preset interface identifier, determining, by the first terminal device, that the second interface belongs to the preset sharing-forbidden interface.

For example, an interface identifier of an incoming call is generally Com.Android.Phone.InCallScreen, and it may be checked whether Com.Android.Phone.InCallScreen belongs to the preset interface identifier.

Likewise, when determining that the second interface does not belong to the preset sharing-forbidden interface, the first terminal device may alternatively use the following manner: obtaining, by the first terminal device, an interface identifier of the second interface; and when the first terminal device determines that the interface identifier does not belong to a preset interface identifier, determining, by the first terminal device, that the second interface does not belong to the preset sharing-forbidden interface.

To reduce power consumption of the second terminal device, in this embodiment of the present invention, after the first terminal device suspends the interface sharing with the second terminal device, the method further includes: sending, by the first terminal device, a decoding stop notification message to the second terminal device to instruct the second terminal device to stop decoding the first interface.

In this way, after the first terminal device suspends sharing of the first interface with the second terminal device, the first terminal device does not send a media stream related to the first interface to the second terminal device, and the second terminal device does not need to be always in a decoding state, thereby reducing power consumption of the second terminal device.

Further, to improve user experience, in this embodiment of the present invention, after the first terminal device suspends the interface sharing with the second terminal device, the method further includes the following operation: sending, by the first terminal device, an interface presentation notification message to the second terminal device, where the interface presentation notification message is used to instruct the second terminal device to present an interface corresponding to the last frame of data that is related to the first interface and that is sent by the first terminal device and received by the second terminal device.

That is, the second terminal device is instructed to display, to the second terminal device, an image of the last frame of data that is related to the first interface and is sent by the first terminal device.

It should be noted that the decoding stop notification message and the interface presentation notification message are not sent in sequence. The decoding stop notification message may be sent first, and then the interface presentation notification message is sent; or the interface presentation notification message may be sent first, and then the decoding stop notification message is sent.

The foregoing describes that the first terminal device instructs, by sending two messages, the second terminal device to stop decoding the first interface and to present the interface corresponding to the last frame of data that is related to the first interface and that is sent by the first terminal device and received by the second terminal device. In actual application, the first terminal device may instruct, by using one message, the second terminal device to stop decoding the first interface and to present the interface corresponding to the last frame of data that is related to the first interface and that is sent by the first terminal device and received by the second terminal device. Certainly, a format of the message may be the same as a format of the decoding stop notification message, or may be the same as a format of the interface presentation notification message, or may be a new message format, and details are not described one by one herein.

In this embodiment of the present invention, there are multiple manners for presenting the first interface and the second interface, for example: the second interface covers the first interface.

Figure 2B:
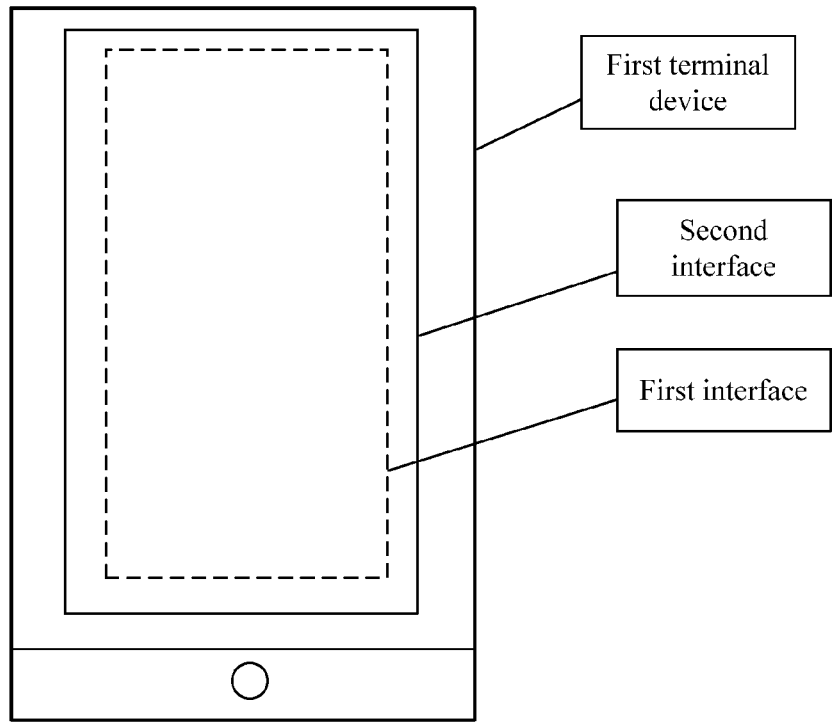
FIG. 2B is a schematic diagram of presentation of a first interface and a second interface according to an embodiment of the present invention.
Figure 2C:
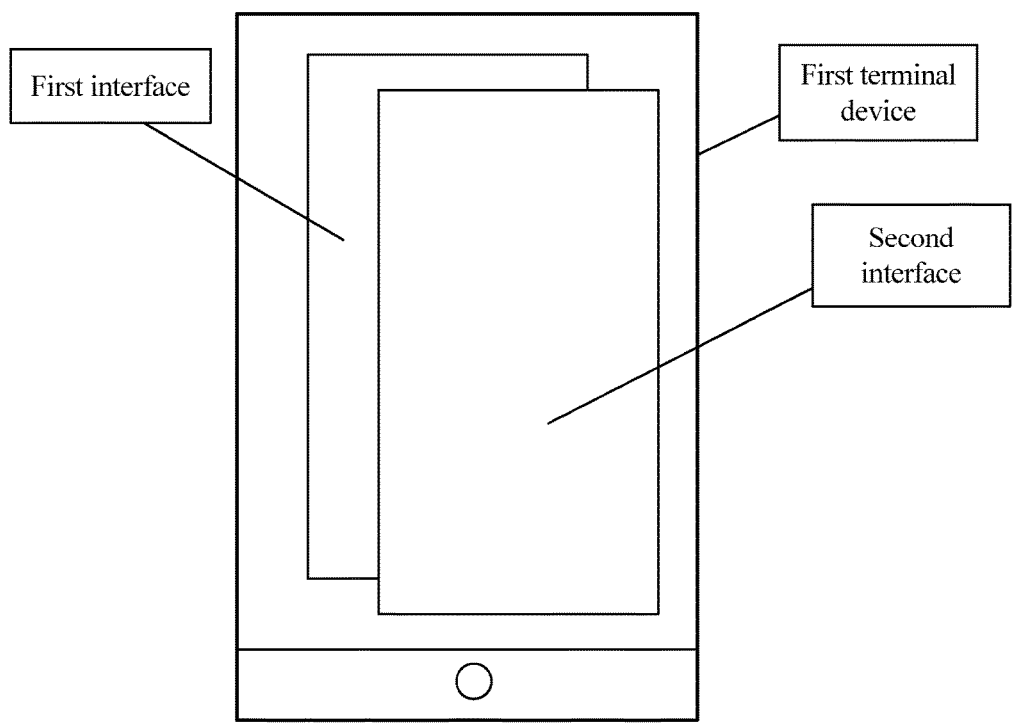
FIG. 2C is another schematic diagram of presentation of a first interface and a second interface according to an embodiment of the present invention.
Figure 2D:
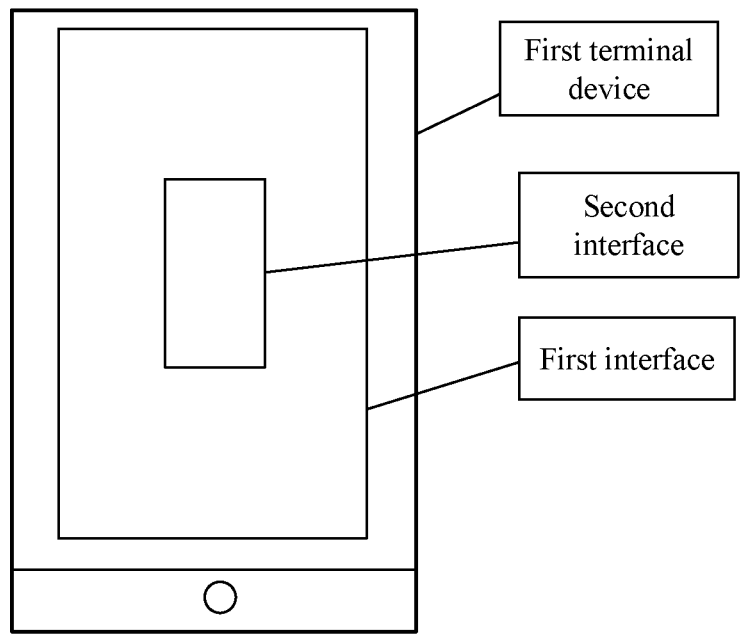
FIG. 2D is another schematic diagram of presentation of a first interface and a second interface according to an embodiment of the present invention.

The second interface may cover the entire first interface, as shown in FIG. 2B, or the second interface may partially cover the first interface, as shown in FIG. 2C, or the second interface covers the first interface in a floating manner, as shown in FIG. 2D.

Figure 2E:
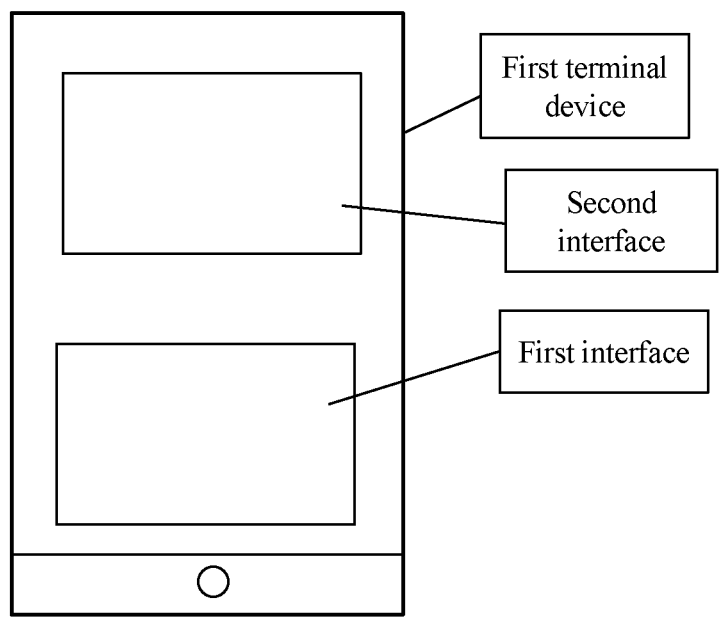
FIG. 2E is another schematic diagram of presentation of a first interface and a second interface according to an embodiment of the present invention.

Certainly, the second interface and the first interface may alternatively be displayed together on a display screen, as shown in FIG. 2E.

In this embodiment of the present invention, if the first interface includes at least one application icon, after the first terminal device shares the first interface with the second terminal device, the method further includes: receiving, by the first terminal device, a first operation request sent by the second terminal device, where the first operation request is used to trigger generation of a third interface; determining, by the first terminal device, a to-be-operated application according to the first operation request; and after determining that the to-be-operated application meets a first preset condition, forbidding, by the first terminal device, sharing of the third interface with the second terminal device.

Figure 2F:
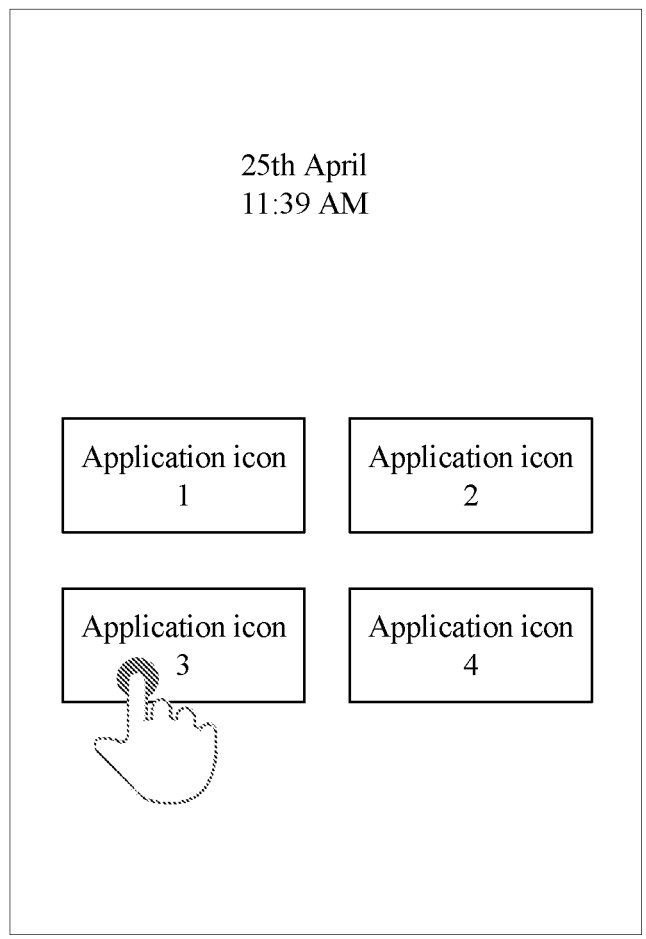
FIG. 2F is a schematic diagram of operating, by a second terminal device, an application corresponding to an application icon in a first interface according to an embodiment of the present invention.

As shown in FIG. 2F, when receiving a click on an application icon 3 performed by a user, the second terminal device sends the first operation request to the first terminal device, where the first operation request is used to trigger generation of the third interface for opening the application icon 3. In this case, the first terminal device determines the to-be-operated application according to the first operation request, and after determining that the to-be-operated application meets the first preset condition, the first terminal device forbids sharing of the third interface with the second terminal device.

In this embodiment of the present invention, the first operation request carries location information of the to-be-operated application in the second terminal device.

In this case, when determining the to-be-operated application according to the first operation request, the first terminal device may use the following manner: determining, by the first terminal device, the to-be-operated application according to the location information.

In this embodiment of the present invention, there are multiple manners for determining, by the first terminal device, that the to-be-operated application meets the first preset condition. For example, optionally, the following manner may be used: obtaining, by the first terminal device, an interface identifier of the third interface, and determining that the interface identifier belongs to a preset interface identifier; or obtaining, by the first terminal device, an application identifier of the to-be-operated application, and determining that the application identifier belongs to a preset application identifier.

In this embodiment of the present invention, further, the method further includes the following operations: after determining that the to-be-operated application does not meet the first preset condition, generating, by the first terminal device according to the first operation request, the third interface used to represent the to-be-operated application; and sharing, by the first terminal device, the third interface with the second terminal device.

In this embodiment of the present invention, after the first terminal device determines that the to-be-operated application does not meet the first preset condition, and before the first terminal device shares the third interface with the second terminal device, the method further includes the following operation: determining, by the first terminal device, that a quantity of times of receiving the first operation request sent by the second terminal device does not reach a preset threshold.

That is, the first terminal device allows the second terminal device to perform an operation on an application corresponding to an icon in the first interface, but an allowed quantity of operation times is limited.

For example, if the preset threshold is 4, the second terminal device sends the first operation request to the first terminal device, where the first operation request is used to open a microblog in the first interface, when the second terminal device sends the first operation request to the first terminal device for first three times, the first terminal device can share a microblog interface with the second terminal device. However, when the second terminal device sends the first operation request to the first terminal device for a fourth time, the first terminal device forbids sharing of the microblog interface with the second terminal device.

In actual application, some interfaces of an application can be shared with the second terminal device, and some interfaces cannot be shared with the second terminal device. In this case, although an application identifier corresponding to the application does not meet the first preset condition, whether some interfaces corresponding to the application can be shared with the second terminal device still needs to be determined. Therefore, in this embodiment of the present invention, after the first terminal device shares the third interface with the second terminal device, the method further includes the following operations: receiving, by the first terminal device, a second operation request sent by the second terminal device, where the second operation request is used to trigger generation of a fourth interface; and when obtaining an interface identifier of the fourth interface, and determining that the interface identifier belongs to the preset interface identifier, forbidding, by the first terminal device, sharing of the fourth interface with the second terminal device.

For example, the first terminal device may share an interface corresponding to a game with the second terminal device. However, the first terminal device forbids sharing of a recharge interface of the game with the second terminal device.

In this embodiment of the present invention, a storage area includes a display memory (the display memory is referred to as a display memory for short) area and a non-display memory area. The display memory area is further divided into a first-type storage area and a second-type storage area. Information stored in the first-type storage area is displayed, and information stored in the second-type storage area is not displayed. When determining whether the second interface can be shared with the second terminal, the first terminal device may first generate the second interface, but data corresponding to the second interface may be placed in the non-display memory area, or may be placed in the second-type storage area of the display memory area. In this way, the first terminal device may first not share the second interface with the second terminal device, and can place, in the first-type storage area of the display memory area only when determining that the second interface can be shared with the second terminal device, the data corresponding to the second interface, thereby achieving an objective of sharing the second interface with the second terminal device.

Figure 3:
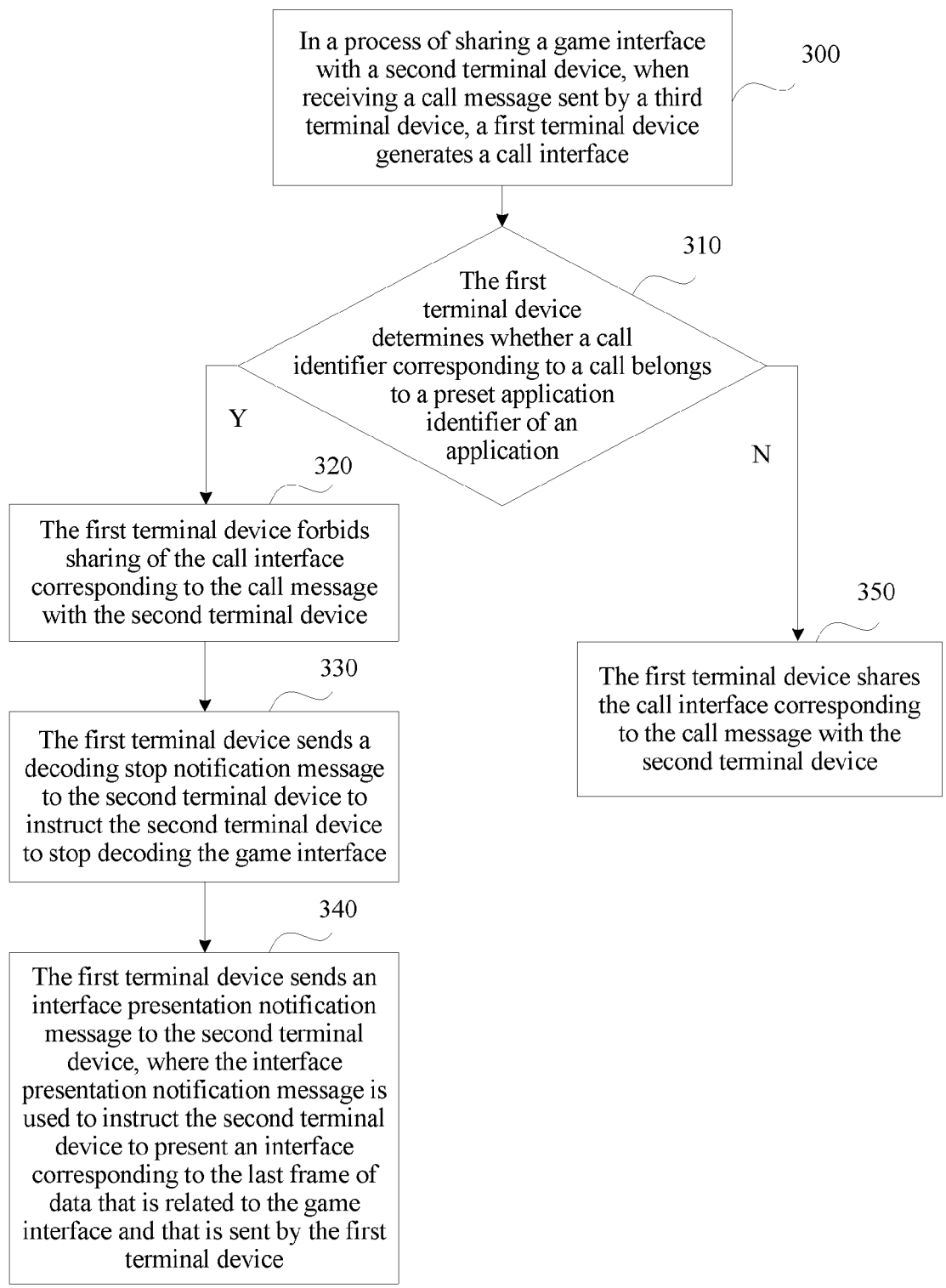
FIG. 3 is an embodiment of interface sharing according to an embodiment of the present invention.

For better understanding of this embodiment of the present invention, the following provides a specific application scenario, and further describes in detail an interface sharing process, as shown in FIG. 3.

Step 300. In a process of sharing a game interface with a second terminal device, when receiving a call message sent by a third terminal device, a first terminal device generates a call interface.

In this step, data corresponding to the call interface may be stored in a non-display memory area, or may be stored in a second-type storage area of a display memory area.

Step 310. The first terminal device determines whether a call identifier corresponding to a call belongs to a preset application identifier of an application; and if yes, performs step 320, otherwise, performs step 350.

Step 320. The first terminal device forbids sharing of the call interface corresponding to the call message with the second terminal device.

Step 330. The first terminal device sends a decoding stop notification message to the second terminal device to instruct the second terminal device to stop decoding the game interface.

Step 340. The first terminal device sends an interface presentation notification message to the second terminal device, where the interface presentation notification message is used to instruct the second terminal device to present an interface corresponding to the last frame of data that is related to the game interface and that is sent by the first terminal device.

Step 350. The first terminal device shares the call interface corresponding to the call message with the second terminal device.

In conclusion, in the interface sharing method provided in this embodiment of the present invention, in a process in which a first terminal device shares a first interface with a second terminal device, when obtaining a notification message used to trigger generation of a second interface, the first terminal device first needs to determine whether the second interface corresponding to the notification message belongs to a preset sharing-forbidden interface. If the second interface belongs to the preset sharing-forbidden interface, the first terminal device shares only the first interface with the second terminal device, or suspends interface sharing with the second terminal device. Therefore, security and flexibility in the interface sharing process are improved.

Based on technical solutions of the foregoing corresponding methods, referring to FIG. 4, an embodiment of the present invention provides a first terminal device 4000. The first terminal device 4000 includes an obtaining unit 40, a determining unit 41, and a sharing unit 42.

The obtaining unit 40 is configured to: in a process of sharing a first interface with a second terminal device, obtain a notification message used to trigger generation of a second interface.

The determining unit 41 is configured to determine whether the second interface corresponding to the notification message belongs to a preset sharing-forbidden interface.

The sharing unit 42 is configured to: when the determining unit 41 determines that the second interface belongs to the preset sharing-forbidden interface, share only the first interface with the second terminal device, or suspend interface sharing with the second terminal device.

In this embodiment of the present invention, further, the sharing unit 42 is further configured to: when the determining unit 41 determines that the second interface does not belong to the preset sharing-forbidden interface, share the generated second interface with the second terminal device.

In this embodiment of the present invention, optionally, the determining unit 41 is specifically configured to: obtain an application identifier of an application corresponding to the notification message; and when determining that the application identifier belongs to a preset application identifier, determine that the second interface belongs to the preset sharing-forbidden interface.

In this embodiment of the present invention, optionally, the determining unit 41 is specifically configured to: obtain an interface identifier of the second interface; and when determining that the interface identifier belongs to a preset interface identifier, determine that the second interface belongs to the preset sharing-forbidden interface.

In this embodiment of the present invention, further, a first sending unit is further included, and the first sending unit is configured to: send a decoding stop notification message to the second terminal device to instruct the second terminal device to stop decoding the first interface. In this embodiment of the present invention, further, a second sending unit is further included, and the second sending unit is configured to: send an interface presentation notification message to the second terminal device, where the interface presentation notification message is used to instruct the second terminal device to present an interface corresponding to the last frame of data that is related to the first interface and that is sent by the first terminal device and received by the second terminal device.

In this embodiment of the present invention, optionally, the second interface covers the first interface, or the second interface and the first interface are displayed together on a display screen.

In this embodiment of the present invention, further, if the first interface includes at least one application icon, a receiving unit is further included, and the receiving unit is configured to: receive a first operation request sent by the second terminal device, where the first operation request is used to trigger generation of a third interface; determine a to-be-operated application according to the first operation request; and after determining that the to-be-operated application meets a first preset condition, forbid sharing of the third interface with the second terminal device.

In this embodiment of the present invention, optionally, the first operation request carries location information of the to-be-operated application in the second terminal device; and that the receiving unit determines a to-be-operated application according to the first operation request is specifically: determining the to-be-operated application according to the location information.

In this embodiment of the present invention, optionally, that the receiving unit determines that the to-be-operated application meets a first preset condition is specifically: obtaining an interface identifier of the third interface, and determining that the interface identifier belongs to a preset interface identifier; or obtaining an application identifier of the to-be-operated application, and determining that the application identifier belongs to a preset application identifier.

In this embodiment of the present invention, further, the sharing unit 42 is further configured to: after the determining unit 41 determines that the to-be-operated application does not meet the first preset condition, generate, according to the first operation request, the third interface used to represent the to-be-operated application; and share the third interface with the second terminal device.

In this embodiment of the present invention, further, the sharing unit 42 is further configured to: determine that a quantity of times of receiving the first operation request sent by the second terminal device does not reach a preset threshold.

In this embodiment of the present invention, further, the receiving unit is further configured to: receive a second operation request sent by the second terminal device, where the second operation request is used to trigger generation of a fourth interface; and when obtaining an interface identifier of the fourth interface, and determining that the interface identifier belongs to a preset interface identifier, forbid sharing of the fourth interface with the second terminal device.

Figure 4A:
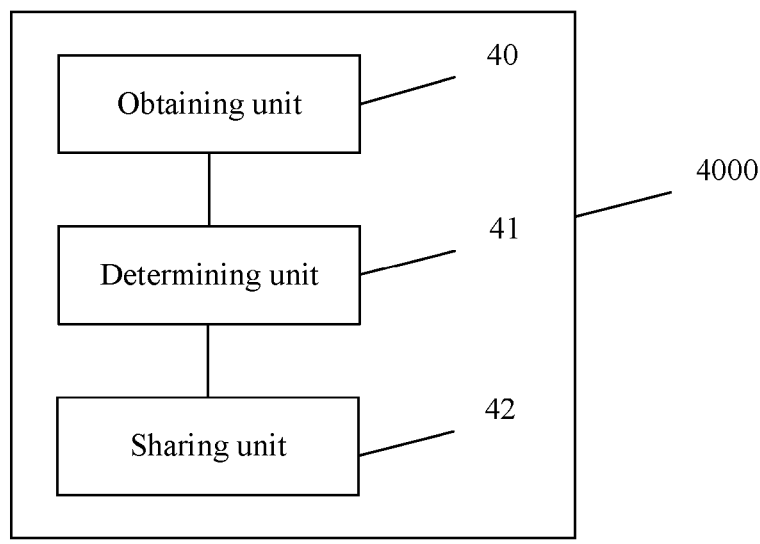
FIG. 4A is a schematic diagram of a function structure of a first terminal device according to an embodiment of the present invention.
Figure 4B:
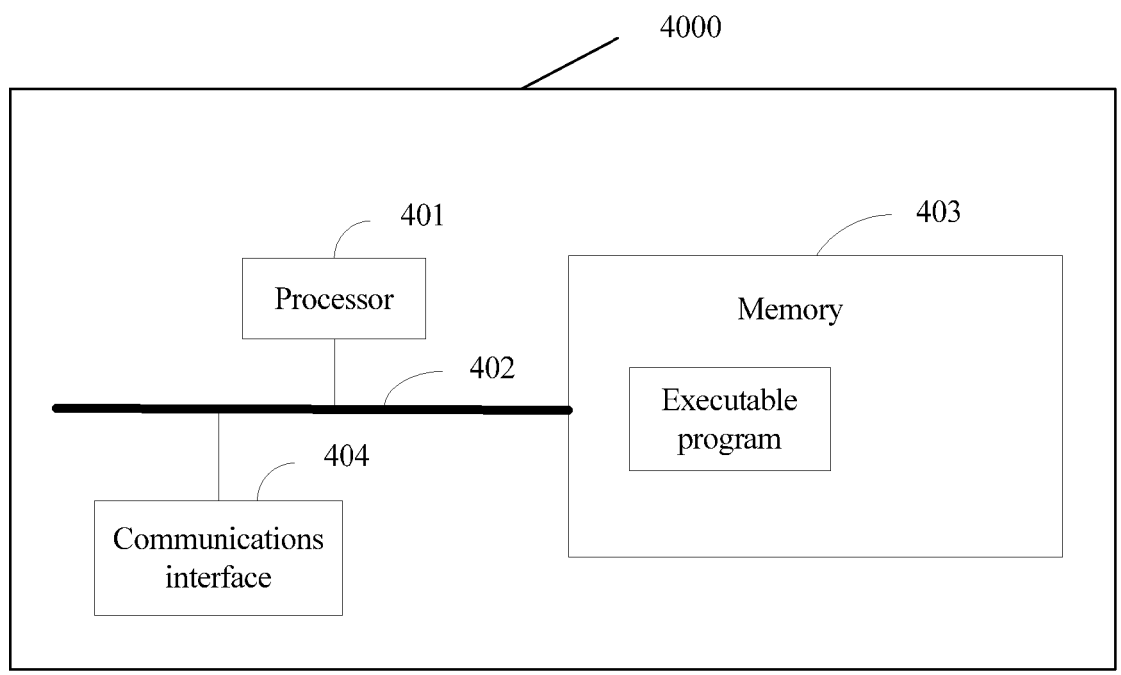
FIG. 4B is a schematic diagram of another function structure of a first terminal device according to an embodiment of the present invention.

As shown in FIG. 4B, FIG. 4B is another schematic structural diagram of a first terminal device 4000 according to an embodiment of the present invention. The first terminal device 4000 includes at least one processor 401, a communications bus 402, a memory 403, at least one communications interface 404, and a receiver 405.

The communications bus 402 is configured to implement connection and communication between the foregoing components.

The communications interface 404 is configured to connect to and communicate with an external device.

The memory 403 is configured to store executable program code.

The receiver 405 is configured to: in a process of sharing a first interface with a second terminal device, obtain a notification message used to trigger generation of a second interface.

The processor 401 executes the program code stored in the memory 403 to: determine whether the second interface corresponding to the notification message belongs to a preset sharing-forbidden interface; and when determining that the second interface belongs to the preset sharing-forbidden interface, share only the first interface with the second terminal device, or suspend interface sharing with the second terminal device.

In this embodiment of the present invention, further, the processor 401 is further configured to: when determining that the second interface does not belong to the preset sharing-forbidden interface, share the generated second interface with the second terminal device.

In this embodiment of the present invention, further, the processor 401 is further configured to: when determining that the second interface does not belong to the preset sharing-forbidden interface, share the generated second interface with the second terminal device.

In this embodiment of the present invention, optionally, the processor 401 is specifically configured to: obtain an interface identifier of the second interface; and when determining that the interface identifier belongs to a preset interface identifier, determine that the second interface belongs to the preset sharing-forbidden interface.

In this embodiment of the present invention, further, a transmitter is further included, and the transmitter is configured to: send a decoding stop notification message to the second terminal device to instruct the second terminal device to stop decoding the first interface.

In this embodiment of the present invention, further, the transmitter is further configured to: send an interface presentation notification message to the second terminal device, where the interface presentation notification message is used to instruct the second terminal device to present an interface corresponding to the last frame of data that is related to the first interface and that is sent by the first terminal device and received by the second terminal device.

In this embodiment of the present invention, optionally, the second interface covers the first interface, or the second interface and the first interface are displayed together on a display screen.

In this embodiment of the present invention, further, if the first interface includes at least one application icon, the receiver 405 is further configured to: receive a first operation request sent by the second terminal device, where the first operation request is used to trigger generation of a third interface; determine a to-be-operated application according to the first operation request; and after determining that the to-be-operated application meets a first preset condition, forbid sharing of the third interface with the second terminal device.

In this embodiment of the present invention, optionally, the first operation request carries location information of the to-be-operated application in the second terminal device; and that the receiver 405 determines a to-be-operated application according to the first operation request is specifically: determining the to-be-operated application according to the location information.

In this embodiment of the present invention, optionally, that the receiver 405 determines that the to-be-operated application meets a first preset condition is specifically: obtaining an interface identifier of the third interface, and determining that the interface identifier belongs to a preset interface identifier; or obtaining an application identifier of the to-be-operated application, and determining that the application identifier belongs to a preset application identifier.

In this embodiment of the present invention, further, the processor 401 is further configured to: after determining that the to-be-operated application does not meet the first preset condition, generate, according to the first operation request, the third interface used to represent the to-be-operated application; and share the third interface with the second terminal device.

In this embodiment of the present invention, further, the processor 401 is further configured to: determine that a quantity of times of receiving the first operation request sent by the second terminal device does not reach a preset threshold.

In this embodiment of the present invention, further, the receiver 405 is further configured to: receive a second operation request sent by the second terminal device, where the second operation request is used to trigger generation of a fourth interface; and when obtaining an interface identifier of the fourth interface, and determining that the interface identifier belongs to a preset interface identifier, forbid sharing of the fourth interface with the second terminal device.

In conclusion, as shown in FIG. 4A or FIG. 4B provided in this embodiment of the present invention, in a process in which a first terminal device shares a first interface with a second terminal device, when obtaining a notification message used to trigger generation of a second interface, the first terminal device first needs to determine whether the second interface corresponding to the notification message belongs to a preset sharing-forbidden interface. If the second interface belongs to the preset sharing-forbidden interface, the first terminal device shares only the first interface with the second terminal device, or suspends interface sharing with the second terminal device. Therefore, security and flexibility in the interface sharing process are improved.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:
1. An interface sharing method, comprising:
   sharing a first interface of a first application installed in a first terminal device with a second terminal device;
   obtaining a notification message to trigger generation of a second interface;

determining whether the second interface of a second application installed in the first terminal device belongs to a preset sharing-forbidden interface;

when the second interface of the second application belongs to the preset sharing-forbidden interface, sharing only the first interface with the second terminal device;

after sharing the first interface with the second terminal device, receiving a first operation request from the second terminal device originated by the first interface on the second terminal device, wherein the first operation request triggers generation of a third interface of a third application installed in the first terminal device;

determining whether the third application meets a first preset condition;

when the third application does not meet the first preset condition, determining whether a quantity of times of receiving the first operation request from the second terminal device exceeds a preset threshold; and when the third application meets the first preset condition or when the quantity of times exceeds the preset threshold, forbidding, by the first terminal device, sharing of the third interface with the second terminal device.

2. The method according to claim 1, further comprising:
when the second interface does not belong to the preset sharing-forbidden interface, sharing the second interface with the second terminal device.

3. The method according to claim 1, wherein determining whether the second interface belongs to the preset sharing-forbidden interface comprises:
obtaining, by the first terminal device, an application identifier of an application corresponding to the notification message; and
when the application identifier belongs to a preset application identifier, determining, by the first terminal device, that the second interface belongs to the preset sharing-forbidden interface.

4. The method according to claim 1, wherein determining whether the second interface belongs to the preset sharing-forbidden interface comprises:
obtaining, by the first terminal device, an interface identifier of the second interface; and
when the interface identifier belongs to a preset interface identifier, determining, by the first terminal device, that the second interface belongs to the preset sharing-forbidden interface.

5. The method according to claim 1, wherein the second interface covers the first interface on a display screen or wherein the second interface and the first interface are displayed together on the display screen.

6. The method according to claim 1, wherein the first interface comprises at least one application icon, wherein the first operation request originates by the first interface on the second terminal device by selection of an application corresponding to the at least one application icon.

7. The method according to claim 1, wherein the first operation request carries location information of the third application in the second terminal device; and
the third application is determined based on the location information.

8. The method according to claim 1, wherein determining whether the third application meets the first preset condition comprises:

obtaining, by the first terminal device, an interface identifier of the third interface, and determining that the interface identifier belongs to a preset interface identifier; or obtaining, by the first terminal device, an application identifier of the third application, and determining that the application identifier belongs to a preset application identifier.

9. The method according to claim 1, further comprising:
when the third application does not meet the first preset condition and when the quantity of times does not meet the preset threshold, sharing, by the first terminal device, the third interface with the second terminal device.

10. The method according to claim 9, wherein determining whether the third application meets the first preset condition comprises:
obtaining, by the first terminal device, an interface identifier of the third interface, and determining that the interface identifier belongs to a preset interface identifier, wherein the method further comprises:
after sharing the third interface with the second terminal device, receiving, by the first terminal device, a second operation request sent by the second terminal device, wherein the second operation request triggers generation of a fourth interface;
obtaining an interface identifier of the fourth interface;
determining whether the interface identifier belongs to the preset interface identifier; and
when the interface identifier belongs to the preset interface identifier, forbidding, by the first terminal device, sharing of the fourth interface with the second terminal device.

11. A first terminal device, comprising:
at least one processor;
a communications bus;
a non-transitory memory;
a communications interface; and
a receiver;
wherein the communications bus is configured to implement connection and communication between the at least one processor, the non-transitory memory, and communications interface, and the receiver;
wherein the communications interface is configured to connect to and communicate with an external device;
wherein the memory is configured to store executable program code;
wherein the receiver is configured to obtain a notification message to trigger generation of a second interface; and
wherein the at least one processor executes the program code stored in the memory to:
share a first interface of a first application of the first terminal device with a second terminal device;
determine whether the second interface of a second application of the first terminal device belongs to a preset sharing-forbidden interface;
when the second interface belongs to the preset sharing-forbidden interface, share only the first interface with the second terminal device;
receive a first operation request from the second terminal device, wherein the first operation request triggers generation of a third interface of a third application of the first terminal device;
determine whether the third application meets a first preset condition;
when the third application does not meet the first preset condition, determine whether a quantity of times of receiving the first operation request from the second terminal device exceeds a preset threshold; and when the third application meets the first preset condition or when the quantity of times exceeds the preset threshold, forbid, by the first terminal device, sharing of the third interface with the second terminal device.

12. The first terminal device according to claim 11, wherein the processor executes the program code stored in the memory to:

share the generated second interface with the second terminal device when the second interface does not belong to the preset sharing-forbidden interface.

13. The first terminal device according to claim 11, wherein the processor executes the program code stored in the memory to:

obtain an application identifier of an application corresponding to the notification message; and when the application identifier belongs to a preset application identifier, determine that the second interface belongs to the preset sharing-forbidden interface.

14. The first terminal device according to claim 11, wherein the processor executes the program code stored in the memory to:

obtain an interface identifier of the second interface; and when the interface identifier belongs to a preset interface identifier, determine that the second interface belongs to the preset sharing-forbidden interface.

15. The first terminal device according to claim 11, wherein the processor executes the program code stored in the memory to:

send a decoding stop notification message to the second terminal device, the decoding stop notification message instructing the second terminal device to stop decoding the first interface.

16. The first terminal device according to claim 11, wherein the processor executes the program code stored in the memory to:

send an interface presentation notification message to the second terminal device, wherein the interface presentation notification message instructs the second terminal device to present an interface corresponding to a last frame of data related to the first interface, the last frame of data being sent by the first terminal device to the second terminal device.

17. The first terminal device according to claim 11, wherein the first interface comprises at least one application icon, and wherein the first operation request indicates selection of an application associated with the at least one application icon originating from the second terminal device.

18. The first terminal device according to claim 11, wherein to determining whether the third application meets the first preset condition comprises:

obtaining, by the first terminal device, an interface identifier of the third interface, and determining that the interface identifier belongs to a preset interface identifier; or obtaining, by the first terminal device, an application identifier of the third application, and determining that the application identifier belongs to a preset application identifier.

19. The first terminal device according to claim 11, wherein the first operation request carries location information of the third application in the second terminal device; and the third application is determined based on the location information.

20. The first terminal device according to claim 11, wherein the processor executes the program code stored in the memory to:

when the third application does not meet the first preset condition and when the quantity of times does not meet the preset threshold, sharing, by the first terminal device, the third interface with the second terminal device.

* * * * *